Sept. 12, 1967  J. E. JOHANSON  3,341,756
ADJUSTABLE LOW-PASS CAPACITOR
Filed June 16, 1966
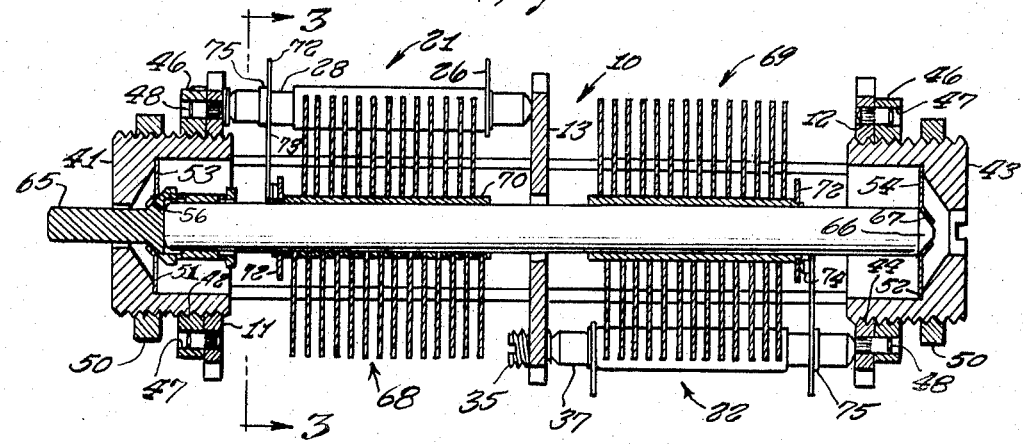
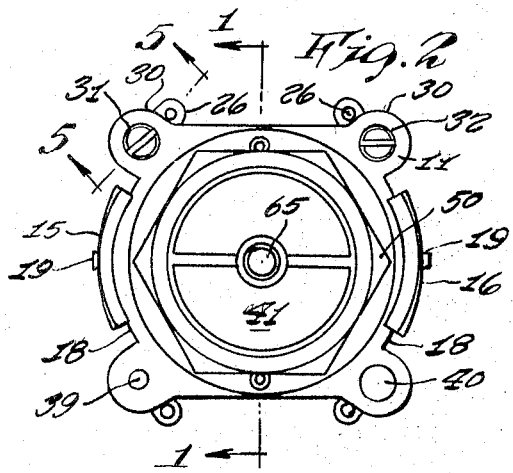
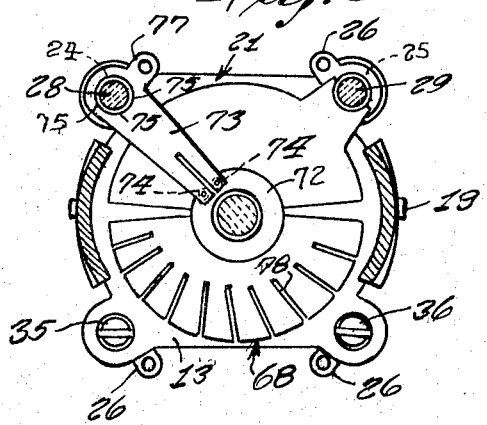
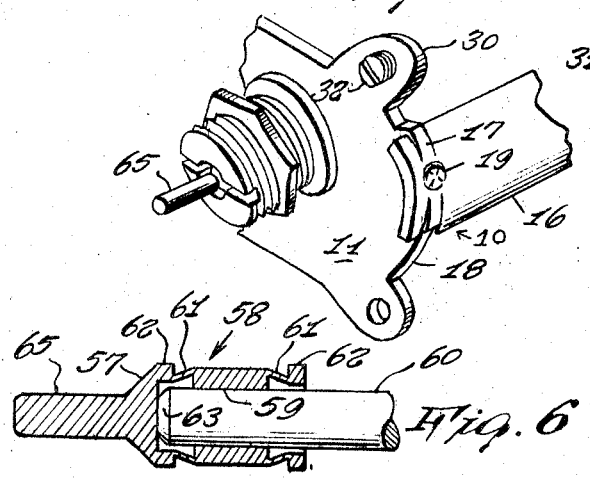
INVENTOR.
JOHN E. JOHANSON
BY
ATTORNEY

United States Patent Office 3,341,756
Patented Sept. 12, 1967

3,341,756
ADJUSTABLE LOW-PASS CAPACITOR
John E. Johanson, P.O. Box 329,
Boonton, N.J. 07005
Filed June 16, 1966, Ser. No. 558,131
10 Claims. (Cl. 317—254)

ABSTRACT OF THE DISCLOSURE

An adjustable air-dielectric capacitor comprising rotor and stator plates. All of the plates are supported by ceramic rods. A rotor assembly journaled in resilient disc members having frusto-conical recesses which cooperate with complementary frusto-conical portions of the rotor assembly to provide friction for holding the rotor plates in a desired position. The stator supporting rods have generally conically ends which hold the rods against both axial and lateral displacements without any precision fit.

---

The present invention relates to adjustable air-dielectric capacitors having both rotor and stator plates which are insulated from ground, and more particularly to capacitors of this type wherein the capacitance to ground of both the rotor and stator plates is minimized.

In the capacitor of the present invention both the rotor and the stator plates are supported by rods formed of insulating material having low dielectric loss, high insulation resistance and suitable mechanical strength such as glass, alumina, or other appropriate vitreous or ceramic material.

An important feature of the invention resides in the mounting of the rotor rod and in the mechanical connection thereto which provides for its rotation. The rotor assembly is journaled in two axially spaced frusto-conically recessed spring discs, the ends of the recesses being open. By adjustment of the axial distance between the discs, an adjustable amount of rotation-resisting friction may be applied to the rotor rod so that the rotor plates will remain fixed in any desired angular position of rotation with respect to the stator plates.

One end of the rotor rod is gripped by a metallic coupling member which has an undersized gripping collar formed in its hollow cylindrical end portion. The gripping collar is yieldingly distended by insertion of one end of the vitreous or ceramic rotor rod so that it firmly grips the rod. A portion of the coupling member forms a projecting shaft for mounting a capacitance adjustment knob or other angular displacement device for rotation of the rotor plates.

The stator plates are likewise mounted on ceramic shafts. The stator shafts, however, are fixedly positioned between adjustable supports whereby an adequate compressive force may be applied to each shaft for retaining each stator shaft fixedly positioned in the frame of the capacitor.

All of the ceramic shafts have generally conically-shaped free ends. The conical ends are utilized for centering purposes in conjunction with appropriately shaped supporting surfaces.

The invention is described in greater detail in the following specification with reference to the accompanying drawing forming a part hereof.

In the drawing:
FIGURE 1 is a side elevational view illustrating a two-section capacitor embodying the invention, the view being in axial section taken along the line 1—1 of FIG. 2.

FIGURE 2 is a front end view of the capacitor shown in FIG. 1 looking toward the right in FIG. 1.

FIGURE 3 is a transverse sectional view taken along the line 3—3 of FIG. 1 looking in the direction of the arrows.

FIGURE 4 is a fragmentary perspective view illustrating details of the capacitor frame.

FIGURE 5 is a sectional view taken along the line 5—5 of FIG. 2 looking outwardly in the direction of the arrows, showing one of the mounting rods for the stator plates.

FIGURE 6 is an enlarged fragmentary view illustrating the resilient coupling sleeve which is connected to the ceramic rotor shaft, deformation of the coupling sleeve being shown on an exaggerated scale.

Referring to the drawing, the capacitor comprises a frame designated generally at 10. The frame 10 includes two end plates 11 and 12 together with an intermediate or central plate 13. The plates 11, 12 and 13 are rigidly secured together by elongated side members 15 and 16.

The side members 15 and 16 are of arcuate transverse cross-sectional configuration. At each location where one of the side members 15 or 16 engages the edge of one of the plates 11, 12 or 13, it is deformed to provide a ridge 17 of increased radius of curvature as compared to the otherwise uniform curvature of the side member 15 or 16 throughout its length. The lateral edges of each of the plates 11, 12 and 13 are circularly curved at 18 concentrically with their centers and at the middle of each curved portion there is an integrally formed stud 19 which extends through an aperture formed in the side member 15 or 16.

The outer end of each stud 19 is riveted over, as shown in FIG. 4. The ridge 17, at its inner surface, has substantially the same radius of curvature as the curved edge 18 of the plate 11, 12 or 13 which it engages. The ridge 17 thus defines an arcuate-bottomed groove the sides of which hold the plate 11, 12 or 13 against pivotal movement about the stud 19. The riveting over of the outer ends of the studs 19 securely assembles the plates 11, 12 and 13 together with the side members 15 and 16 to form the rigid frame 10.

Two groups of stator plates each designated generally as 21 and 22 are provided. Although two groups are shown in the drawing, for purposes of illustration, a single group may be used or a plurality of groups in excess of two may be provided, if desired. Each stator group consists of a uniformly axially spaced series of stator plates 21 which are electrically connected to and rigidly mounted on two metal tubes 24 and 25 by welding, soldering or other convenient method. A stator terminal lug 26 is similarly secured to one end of each of the tubes 24 and 25 by welding, soldering or the like.

Each tube 24 is mounted on a ceramic rod 28 and each tube 25 is mounted on a similar ceramic rod 29. The rods 28 and 29 are preferably formed of alumina and coated with a silicone varnish to exclude moisture. Both ends of each rod 28, 29 are generally conically shaped with an apex angle of the order of 45°. The tubes 24, 25 are fixedly secured to the rods 28, 29 by a suitable adhesive such as an epoxy resin which becomes permanently hardened. A suitable epoxy resin is commercially available under the trade name "Araldite." This resin has a melting point of 460° F.

The end plate 11 has a tapped hole formed in each of the two upper ear portions 30 thereof and in which are mounted two horizontally spaced set screws 31 and 32. The two upper ear portions of the central plate 13 have two small untapped holes 34 (FIG. 5) which are in axial alignment with the rotational axes of the set screws 31 and 32. The conically shaped ends of the ceramic rods 28 and 29 are engaged at the front of the capacitor in complementary conically shaped recesses formed in the ends of the set screws 31 and 32, respectively. The rear ends of rods 28 and 29 are held in the untapped small holes 34. By suitable adjustment of the set screws 31 and 32, the ceramic rods 28 and 29 are securely held between the front end plate 11 and the intermediate plate 13.

The rear group of stator plates 22 is similarly held by two set screws 35, 36 in the lower portion of the intermediate plate 13. The two set screws engage two ceramic rods 37, only one of which is visible in the drawing. The rods 37 are similar to the rods 28 and 29, described above. The rear group of stator plates is otherwise constructed and arranged in the same manner as the front group of stator plates 21.

The front plate 11 has a small hole 39 formed therein which may be used for the soldered connection of a ground or other conductor, if desired. The front plate 11 also has a larger hole 40 formed therein which may be utilized for the mounting of one or more auxiliary circuit elements (not shown) of other purposes, as desired.

An exteriorly threaded bearing bushing 41 is mounted in a complementary tapped hole 42 formed in the front plate 11. A similar rear bearing bushing 43 is mounted in a tapped hole 44 formed in the rear plate 12 in axial alignment with the front bearing bushing 41. Additional support and a controlled frictional engagement for the bushings 41 and 43 in the tapped holes 42 and 44 is provided by circular lock nuts 46. When the desired frictional fit has been obtained by careful adjustment, two holes 47 are drilled in the lock nut and the position permanently fixed by the insertion of drive pins 48 into aligned holes in the end plates 11 and 12. The end portions of the drive pins 48 are knurled to hold the pins against axial movement except in response to a large force deliberately applied in order to remove the drive pins 48 and lock nuts 46 for purposes of disassembly or readjustment. The bearing bushings 41 and 43 are provided with hexagonal mounting nuts 50 for securing either end of the capacitor to a mounting panel (not shown) after passage of the bushing through a suitable clearance hole in the panel.

Each of the bushings 41 and 43 is annularly shouldered at 51 and 52, respectively, to engage front bearing member 53 and rear bearing member 54. The front bearing member 53 is a thin circular disc formed of resilient sheet metal such as beryllium copper alloy and has a centrally apertured frusto-conical depression 56 formed therein which frictionally engages a complementary frusto-conical shoulder 57 formed on a coupling member 58. The coupling member 58 has an integrally formed inwardly extending annular gripping band portion 59 which frictionally holds the front end of a ceramic rotor shaft 60. The rotor shaft 60, like the rods 28 and 29, is preferably formed of alumina and coated with a silicone varnish to exclude moisture.

The internal diameter of the gripping band portion 59 is precision machined to close tolerances and the diameter of the rotor shaft 60 is likewise precisely dimensioned so that the shaft is of the order of .001 inch (about ½% to 1%) oversize before insertion in the coupling member 58. The annular gripping band portion 59 is thus yieldingly distended by encircling the rotor shaft 60. The gripping band portion 59 is connected by thin-walled integrally formed cylindrical sections 61 with relatively thick-walled annular portions 62, whereby, when the front end of the rotor shaft 60 is forced into the coupling member 58, the gripping band portion 59 will expand and securely grip the rotor shaft 60 as shown on an exaggerated scale in FIG. 6. By the proper selection and heat treatment of the metal of which coupling member 58 is formed and by accurate control of the precision dimensioning of the rotor shaft 60 and gripping band portion 59, a permanently secure fit may be obtained without overstressing the ceramic material of which the rotor shaft 60 is formed. The front end of the rotor shaft 60 is chamfered as indicated at 63 to facilitate ready assembly with the coupling member 58. The front end of the coupling member 58 comprises a control shaft portion 65 which extends through the central aperture in the front bearing member 53. A turning knob or other device (not shown) may be connected to the control shaft portion 65 for rotation of the rotor shaft 60.

The rear end of the rotor shaft 60 is frusto-conically shaped at 66 for frictional engagement with a complementary centrally apertured depression 67 formed in the rear bearing member 54 in the same manner as the depression 56 in the front bearing member 53. The construction and configuration of the front and rear resilient bearing members 53 and 54 are the same and they are fully interchangeable. The rotor shaft 60 is thus resiliently rotatably mounted in the frame 10. By adjustment of the front and rear bearing bushings 41 and 43, the axially directed component of the pressure acting on the frusto-conical shoulder 57 of coupling member 58 and on the frusto-conical rear end 66 of rotor shaft 60 may be adjusted. This will vary the frictional resistance to rotation of the rotor shaft 60 without disturbing the spacing between the rotor and stator plates. Both resilient bearing members 53 and 54 are provided wih a suitable lubricant for preventing wear. Preferably, the lubricant is a silicone grease.

A front group of rotor plates 68 cooperates with the front group of stator plates 21 and a rear group of rotor plates 69 cooperates with the rear group of stator plates 22. The two groups of rotor plates 68, 69 are angularly displaced from each other by 180° so that their common center of gravity lies on the longitudinal axis of the rotor shaft 60. The rotor shaft 60 thus carries a balanced load and the weight of the rotor plates 68, 69 has no tendency to turn the rotor shaft 60 by gravitational action. Where an odd number of groups of rotor plates is present, a counterweight (not shown) may be provided or they may be angularly spaced or otherwise arranged to provide a balanced construction.

Each group of rotor plates 68, 69 is welded, soldered or otherwise fixedly and electrically conductively secured to a metallic mounting tube 70. Each mounting tube 70 is cemented to the rotor shaft 60 by a suitable epoxy resin as described above in connection with stator plate mounting tubes 24 and 25. A rotary contact disc 72 is fixed to one end of each tube 70. A bifurcated contact spring 73 carries a pair of contacts 74 each of which is separately yieldingly pressed into continuous engagement with the rotary contact disc 72. The outer end portion of each contact spring 73 is welded, soldered or otherwise fixed to a tubular collar 75. For the front rotor plates 68 the collar 75 is cemented by epoxy resin to the ceramic stator rod 28 and to ceramic rod 37 for the rear rotor plates 69. Each contact spring 73 is provided with an apertured integrally formed lateral extension 77 which is directed radially outwardly from the collar 75 and which serves as a soldering terminal for establishing an electrical connection to the rotor plates 68 or 69.

At least one end rotor plate of each group 68, 69 is slotted as indicated at 78 in FIG. 3 to permit bending of a sector of the plate toward or away from the adjacent stator plate. This permits minor adjustment of the capacitance-angular position characteristics of the capacitor section.

While I have shown and described what I believe to be the best embodiment of my invention, it will be apparent to those skilled in the art that various changes and modifications may be made therein without departing from the spirit and scope of the invention as defined in the appended claims.

What is claimed is:

1. A variable capacitor, comprising: an elongated frame; a group of stator plates carried by said frame; two axially aligned bearing bushing members threaded into opposite end portions of said frame; two confronting resilient disc members each disposed in one of said bushing members, said disc members having axially aligned frusto-conical depressions formed therein the depression in each disc member being convergent away from the depression in the other disc member; elongated mounting means having complementary frusto-conical surfaces rotatably engaging said depressions; and a group of rotor plates carried by said mounting means and cooperating with stator plates.

2. A capacitor according to claim 1, wherein one of said depressions is centrally apertured, and in which said mounting means comprises an elongated portion extending freely axially through the aperture in said depression for turning said rotor plates.

3. A capacitor according to claim 2, wherein said mounting means comprises a rotor rod formed of ceramic material, said group of rotor plates being carried by said rod, and in which said mounting means further comprises a coupling member formed of metal, said coupling member comprising a gripping portion including an annular band encircling one end portion of said rod, said band being yieldingly distended by engagement with said rod, said coupling member having a frusto-conical surface complementary to and engaging said apertured depression, said elongated portion of said mounting means being connected to said coupling member.

4. A capacitor according to claim 1, wherein said mounting means comprises; a rotor rod of ceramic material; a metallic tube ensleeving said rotor rod and to which said group of rotor plates is rigidly secured and electrically connected; adhesive means fixedly securing said tube to rotor rod; terminal means and means establishing a continuous electrical connection between said terminal means and said tube in all positions of rotation of said rotor rod.

5. A capacitor according to claim 4, wherein said adhesive means is an epoxy resin having a melting point of about 460° F.

6. A variable capacitor, comprising: an elongated frame; rotor rod means rotatably journaled in said frame; a group of rotor plates carried by said rod means; means establishing continuous electrical contact with said rotor plates in all positions of rotation thereof; a plurality of metallic tubes; a group of stator plates rigidly electrically connected to said tubes; a ceramic rod in each tube, each rod having generally conically shaped ends; adhesive means fixedly securing each tube to one of said rods; means in said frame receiving one end of each of said rods; and set screw means in said frame receiving the other end of each rod and adjustably applying axially directed pressure thereto.

7. A capacitor according to claim 6, wherein said adhesive means is an epoxy resin having a melting point of about 460° F.

8. A variable capacitor comprising: a plurality of supporting plates having arcuately shaped peripheral portions; a plurality of strip members having arcuately shaped cross-sectional configurations the radius of curvature of which is less than that of said peripheral portions, each strip member having a plurality of transversely extending deformations formed therein for receiving said peripheral portions therein, the radius of curvature of said strip members at said deformations being effectively the same as that of said peripheral portions, each strip member having an aperture formed therein intermediate the ends thereof; and an integrally formed stud extending outwardly from each peripheral portion and extending through one of said apertures, each stud being deformed at its outer end to secure one of said strip members fixedly to one of said peripheral portions.

9. A capacitor comprising: a frame structure; cooperating rotor and stator plates in said frame structure; an elongated rotor rod formed of ceramic material; first bearing means journaling one end portion of said rod for rotation in said frame structure about the longitudinal axis of said rod, said rotor plates being mounted on said rod for rotation therewith; a metallic coupling member connected to the other end portion of said rod, said coupling member comprising a gripping portion including an annular band encircling rod in proximity to the other end thereof, said band being yieldingly distended by engagement with said rod; and second bearing means journaling said coupling member in said frame structure.

10. A capacitor according to claim 9, wherein said gripping portion of said coupling member comprises a hollow cylindrical body portion within which said other end portion of said rod is received, said band being connected to said body portion by at least one wall portion of said body portion the wall thickness of which is less than that of said band for permitting said band to become distended independently of said body portion.

References Cited

UNITED STATES PATENTS

| | | | |
|---|---|---|---|
| 1,613,032 | 1/1927 | Goudy | 317—253 |
| 1,700,259 | 1/1929 | Hardy | 317—254 |
| 1,749,042 | 3/1930 | Marshall | 317—253 |
| 1,853,213 | 4/1932 | Koepping | 317—254 |
| 2,422,454 | 6/1947 | Weiss | 317—254 X |

OTHER REFERENCES

Moss, C. F.: Araldite in British Plastics, Nov. 1948, pp. 521 to 527.

LEWIS H. MYERS, *Primary Examiner.*

E. A. GOLDBERG, *Assistant Examiner.*